Feb. 4, 1941.  H. HEUSCHMANN  2,230,537
CAPACITY TYPE ALTIMETER FOR AIRCRAFT
Filed March 21, 1940

INVENTOR
Hans Heuschmann
BY
Stephen Cerstvik
ATTORNEY

Patented Feb. 4, 1941

2,230,537

UNITED STATES PATENT OFFICE 2,230,537

CAPACITY TYPE ALTIMETER FOR AIRCRAFT

Hans Heuschmann, Berlin-Spandau, Germany, assignor to Siemens Apparate und Maschinen Gesellschaft mit beschrankter Haftung, Berlin, Germany, a corporation of Germany Application March 21, 1940, Serial No. 325,266
In Germany February 7, 1939

4 Claims. (Cl. 250—1)

This invention relates to an aerial arrangement consisting of two aerials designed preferably in the form of rods or plates arranged on airplanes for determining the altitude by the electrical method, particularly for the measurement of small heights of flight. To this end, as is well known, the so-called capacitive method of measuring altitudes is employed which is based on the fact that the capacity between various aerials suitably arranged on the airplane depends upon the height of the airplane above ground. This capacity is preferably measured in a bridge connection with the aid of a relatively low frequency. However, it is not possible when taking measurements to consider separately this capacity varying with height, since, as will be seen from Fig. 1, the aerials 2 and 3 with the aid of which measurements are effected and which are secured to the airplane 1, not only have a certain capacity to earth, but the aerials have a capacity with respect to the airplane as well as with respect to each other. Furthermore, the airplane also has a capacity to earth. It is true that a portion of the part-capacities not to be measured may be rendered ineffective in the bridge connection. Only the capacity of the airplane with respect to earth still interferes with the measurement. The magnitude $C_x$ to be measured is equal to the earth capacity $C$ of one of the aerials, reduced in proportion of the capacity $C$ to the earth capacity $C_F$ of the airplane, i. e., $$C_x = C \cdot \frac{C}{C_F} = \frac{C^2}{C_F}$$

This relation between the magnitude to be measured and the capacity between aerial and airplane entails a reversal of the magnitude to be measured in the neighborhood of ground in the case of an unsuitable shape and arrangement of the aerial. While at a short distance from ground the conditions are such that the magnitude to be measured $C_x$ becomes the greater, the more the earth is approached, a reversal of the indication occurs under circumstances in the immediate neighborhood of ground.

If, as has hitherto been the case, both aerials are arranged on the supporting surfaces they are, when landing, at a certain distance above ground, whereas the stern of the airplane nearly touches the ground. In this position the capacity of the airplane to ground suddenly assumes relatively very great values, whereas the capacity of the aerial to ground increases only gradually. Consequently, upon the rapid increase of the denominator of the above-mentioned equation, the magnitude $C_x$ to be measured which uniformly increased when descending from considerable heights becomes again smaller in the immediate neighborhood of ground. The indication of the altimeter is therefore inaccurate, even false at the moment when the pilot should have an accurate indication of the height shortly before the airplane sets down.

The object of the present invention is to avoid the above-mentioned drawback and to ensure an accurate measurement from the time when the airplane begins to alight till it touches the ground. This is accomplished according to the invention by arranging the aerials on the airplane at such a height with respect to the airplane parts which when landing first touch the ground that their earth capacity $C$ also varies in the neighborhood of ground more rapidly than $\sqrt{C_F}$. Since a symmetrical arrangement of both aerials at such a height is not often possible, an asymmetrical arrangement has proved successful, i. e., by arranging one aerial below and the other above the optimum height. In this manner one aerial is secured to the supporting surface and the other to the stationary part of the horizontal tail unit, i. e., preferably in such a manner that the aerials are separately arranged in opposite quadrants of the system of axes formed of the horizontal airplane axes.

In the accompanying drawing.

Figure 1:
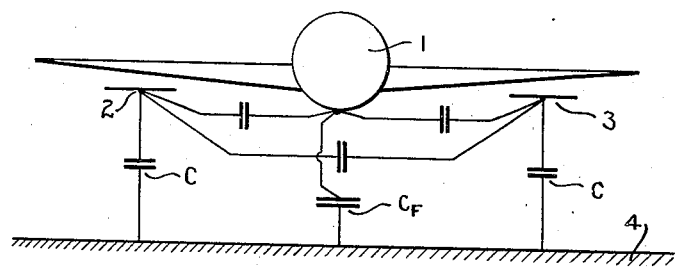
Fig. 1 shows diagrammatically one form of the invention.
Figure 2:
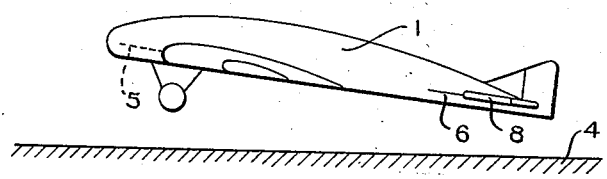
Fig. 2 is a lateral view of an airplane shortly before setting down when landing; and, Fig. 3 is a top view of the same airplane.

In the form of the invention shown rod-like aerials 5 and 6 are employed in carrying out measurements. The aerial 5 is arranged on the front edge of the right supporting surface 7 and the aerial 6 at the left on the front edge of the stationary part of the horizontal tail unit 8, i. e., at the height of the fuselage end. Of course, the aerial 5 may also be arranged at the left and the aerial 6 at the right. As will be apparent from Fig. 2 not only the airplane shortly before alighting but also one of the aerials, i. e., that secured to the horizontal tail unit, approach the ground very closely. To the great increase in capacity between airplane and ground corresponds then an increase in capacity between aerial and ground of substantially the same magnitude. Consequently, a reversal of the magnitude to be measured in the immediate neighborhood of ground no longer occurs.

Figure 3:
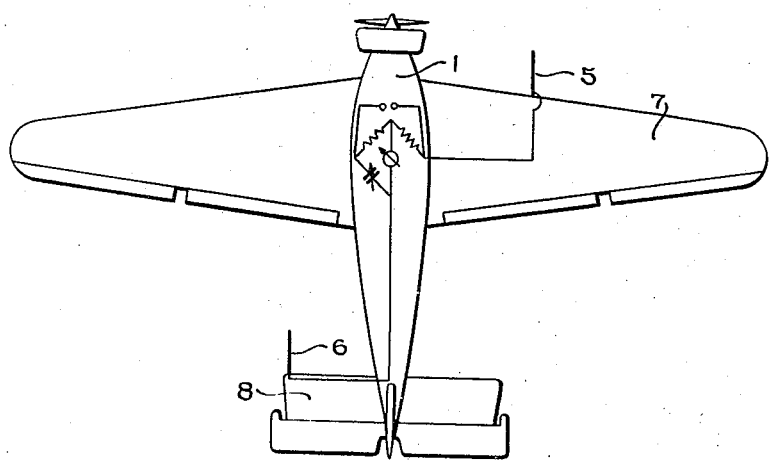

A further detail of the invention is apparent from Fig. 3. The two aerials are in this case arranged symmetrically to the longitudinal axis as well as to the transverse axis of the airplane. In this manner the measurement of height is entirely independent of the bank of the airplane. The average ground capacity of the pair of aerials remains constant irrespective of whether the airplane is inclined about the longitudonal axis as well as about the transverse axis, since one aerial always lowers by approximately the same amount as the other aerial rises. In the arrangements hitherto known the aerials were at most symmetrical only with respect to one axis of the airplane. Accordingly, the measurement of height was independent of the bank of the airplane to a slighter extent.

What is claimed is:

1. The combination with an aircraft having a main wing and a tail surface, of a condenser element upon said main wing on one side of the longitudinal axis of said aircraft, a condenser element upon said tail surface on the other side of said longitudinal axis, and means for measuring the capacity between the elements.

2. The combination with an aircraft having a main wing and a tail surface, of an element having a capacity with the earth and mounted on said main wing on one side of the longitudinal axis of said aircraft, a second element having a capacity with the earth and mounted on said tail surface on the other side of said longitudinal axis, the elements being disposed symmetrically with respect to both the longitudinal and transverse axes of said aircraft, and means for measuring the capacity between the elements.

3. The combination with an aircraft having a main wing and a tail surface, of an antenna mounted upon the main wing on one side of the longitudinal axis of said aircraft, an antenna mounted upon the tail surface on the other side of said longitudinal axis, and means for measuring the capacity between the elements.

4. The combination with an aircraft having a main wing and a tail surface, and having longitudinal and transverse axes, the latter dividing the craft into quadrants, an antenna mounted upon said main wing in one of said quadrants, another antenna mounted upon the tail surface in a quadrant opposite to the first-named quadrant, and means for measuring the capacity between said antennae.

HANS HEUSCHMANN.